(12) United States Patent
Aggas

(10) Patent No.: US 6,352,749 B1
(45) Date of Patent: Mar. 5, 2002

(54) VACUUM IG UNIT WITH TRANSPARENT SPACERS

(75) Inventor: Steven L. Aggas, Pinoknoy, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/458,670

(22) Filed: Dec. 10, 1999

(51) Int. Cl.[7] .................................................. E06B 3/24
(52) U.S. Cl. ...................................... 428/34; 52/786.13
(58) Field of Search .......................... 428/34, 192, 120; 52/786.13, 786.1

(56) References Cited

U.S. PATENT DOCUMENTS

| | | |
|---|---|---|
| 49,167 A | 1/1865 | Stetson |
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,962,409 A | 11/1960 | Ludlow et al. |
| 3,441,924 A | 4/1969 | Peek et al. |
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,514,450 A | 4/1985 | Nowobilski et al. |
| 4,683,154 A | 7/1987 | Benson et al. |
| 4,786,344 A | 11/1988 | Beuther |
| 4,824,215 A | 4/1989 | Joseph et al. |
| 4,874,461 A | 10/1989 | Sato et al. |
| 4,924,243 A | 5/1990 | Sato et al. |
| 4,983,429 A | 1/1991 | Takayanagi et al. |
| 5,124,185 A | 6/1992 | Kerr et al. |
| 5,157,893 A | 10/1992 | Benson et al. |
| 5,234,738 A | 8/1993 | Wolf |
| 5,247,764 A | 9/1993 | Jeshurun et al. |
| 5,315,797 A | 5/1994 | Glover et al. |
| 5,399,406 A | 3/1995 | Matsuo et al. |
| 5,489,321 A | 2/1996 | Tracy et al. |
| 5,499,128 A | 3/1996 | Hasegawa et al. |
| 5,596,981 A | 1/1997 | Soucy |
| 5,643,644 A | 7/1997 | Demars |
| 5,657,607 A | 8/1997 | Collins et al. |
| 5,664,395 A | 9/1997 | Collins et al. |
| 5,739,882 A | 4/1998 | Shimizu et al. |
| 5,855,638 A | 1/1999 | Demars |
| 5,891,536 A | 4/1999 | Collins et al. |
| 5,902,652 A | 5/1999 | Collins et al. |
| 5,989,659 A | 11/1999 | Kato et al. |
| 6,049,370 A | 4/2000 | Smith, Jr. et al. |

FOREIGN PATENT DOCUMENTS

FR    2 482 161    11/1981

OTHER PUBLICATIONS

Grant and Hack's Chemical Dictionary, 5th edition 1987.*

* cited by examiner

Primary Examiner—Donald J. Loney
(74) Attorney, Agent, or Firm—Nixon & Vanderhye P.C.

(57) ABSTRACT

A vacuum insulating glass (IG) unit. A plurality of substantially transparent sapphire or $Al_2O_3$ inclusive spacers or pillars are provided between the opposing glass substrates. The translucent characteristics of the spacers/pillars enable them to be more aesthetically pleasing, while at the same time being strong enough to support the opposing substrates and withstand the applicable forces of atmospheric pressure.

15 Claims, 2 Drawing Sheets

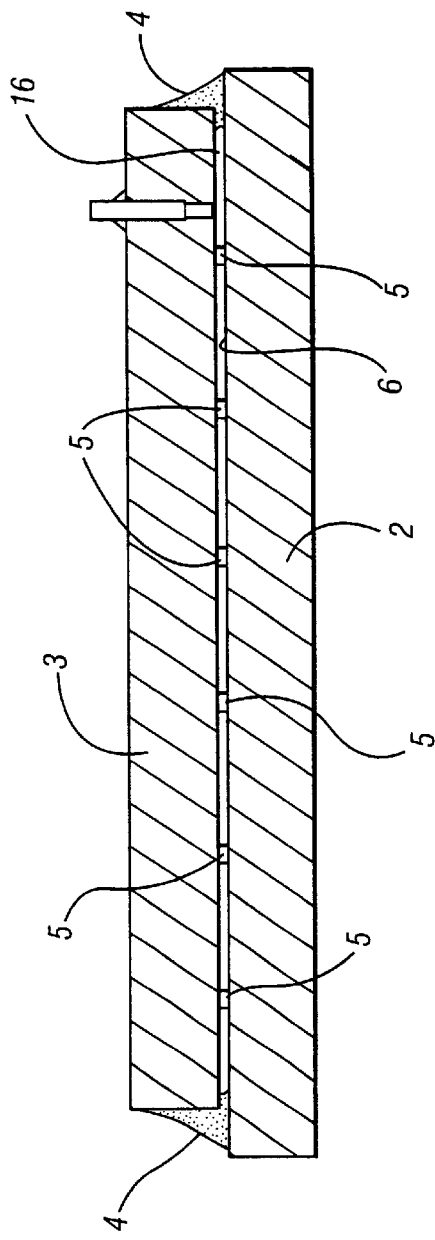
Fig. 3
(Prior Art)
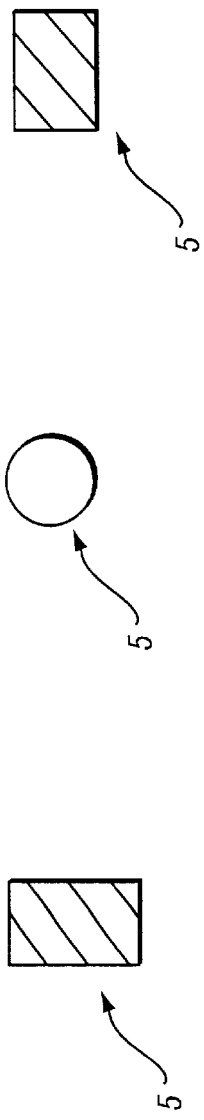
Fig. 5
Fig. 4(b)
Fig. 4(a)

VACUUM IG UNIT WITH TRANSPARENT SPACERS

RELATED APPLICATIONS

Commonly owned U.S. Ser. Nos. 09/303,550 entitled "VACUUM IG PILLAR WITH DLC COATING" filed May 3,1999 pending; Ser. No. 09/404,659 filed Sep. 24,1999 pending entitled "VACUUM IG WINDOW UNIT WITH PERIPHERAL SEAL AT LEAST PARTIALLY DIFFUSED AT TEMPER"; and Ser. No. 09/440,697 filed Nov. 16,1999 pending entitled "VACUUM IG WINDOW UNIT WITH FIBER SPACERS", are all hereby incorporated herein by reference.

This invention relates to a vacuum insulating glass (IG) unit. More particularly, this invention relates to a vacuum IG unit including substantially transparent spacers.

BACKGROUND OF THE INVENTION

Vacuum IG units are known in the art. For example, see U.S. Pat. Nos. 5,664,395, 5,657,607, 5,891,536 and 5,902,652, the disclosures of which are all hereby incorporated herein by reference.

Prior art FIGS. 1–2 illustrate a conventional vacuum IG unit. IG unit 1 includes two spaced apart sheets of glass 2 and 3 which enclose an evacuated or low pressure space 16 therebetween. Glass sheets 2 and 3 are interconnected by peripheral or edge seal of fused solder 4 and an array of support pillars 5.

Pump out tube 8 is sealed by solder glass 9 to an aperture or hole which passes from an interior surface of glass sheet 2 to the bottom of recess 11. A vacuum is attached to tube 8 (prior to the tube being sealed) so that the interior space 16 between sheets 2 and 3 can be evacuated to create a low pressure area. After evacuation, an end of tube 8 is melted to seal the vacuum in space 16.

As illustrated in FIGS. 1–2, spacers or pillars 5 are typically provided between the glass sheets 2 and 3 in the viewing area of the unit. As discussed in U.S. Pat. No. 5,664,395, these spacers or pillars may be made of nickel, iron, molybdenum, tungsten, tantalum, titanium, aluminum, steel or stainless alloys. Unfortunately, such metal spacers or pillars are substantially opaque to visible light, and thus may be considered an eyesore (i.e., aesthetically nonpleasing) to those viewing the window because they are scattered throughout the viewing zone.

It is also known to make such spacers or pillars of spherical glass beads, as discussed, for example, in U.S. Pat. No. 4,683,154. Unfortunately, glass bead spacers may be susceptible to breaking or cracking in certain instances and are undesirable for this reason alone.

FIG. 3 is a side cross sectional view of another conventional vacuum IG window unit. This unit differs from that of FIGS. 1–2 in that the glass sheets of FIG. 3 are of different sizes, and edge seal 4 contacts an outer vertically extending periphery of one of the glass sheets. However, this unit suffers from the same problems as the unit of FIGS. 1–2 as the spacers are the same.

It is apparent from the above that there exists a need in the art for a vacuum IG unit including spacers or pillars that are visible unobtrusive, substantially transparent to certain visible wavelengths of light, aesthetically pleasing, and/or of high strength.

This invention will now be described with respect to certain embodiments thereof, accompanied by certain illustrations.

SUMMARY OF THE INVENTION

An object of this invention is to provide spacers or pillars that are substantially transparent to certain visible wavelengths of light, for use in a vacuum IG window unit.

Another object of this invention is to provide aesthetically pleasing and high strength spacers or pillars in a vacuum IG window unit.

Another object of this invention is to provide sapphire inclusive spacers or pillars for a vacuum IG window unit.

Another object of this invention is to provide $Al_2O_3$ inclusive spacers or pillars for a vacuum IG window unit.

Another object of this invention is to fulfill any and/or all of the above-listed objects and/or needs.

Generally speaking, this invention fulfills any or all of the above described objects or needs in the art by providing a thermally insulating glass panel comprising:

first and second spaced apart glass substrates defining a low pressure space therebetween having a pressure less than atmospheric pressure;

a plurality of spacers disposed between said first and second glass substrates for spacing said substrates from one another in order to maintain said low pressure space therebetween;

a hermetic edge or peripheral seal including at least one sealing material; and wherein at least some of said spacers include sapphire so as to be substantially transparent to at least certain wavelengths of visible light.

In certain embodiments, at least some of said spacers are transparent to at least about 90% of visible light wavelengths.

IN THE DRAWINGS

FIG. 3 is a side cross sectional view of another conventional vacuum IG window unit.

FIG. 4(*a*) is a side cross sectional view of a spacer or pillar according to an embodiment of this invention, this spacer or pillar being useable in any of the FIG. 1–3 vacuum IG window units.

FIG. 4(*b*) is a top plan view of the spacer or pillar of FIG. 4(*a*).

FIG. 5 is a side cross sectional view of a spacer or pillar according to another embodiment of this invention, this spacer or pillar being useable in any of the FIG. 1–3 vacuum IG window units.

DETAILED DESCRIPTION OF CERTAIN EMBODIMENTS OF THIS INVENTION

Figures 1, 2:
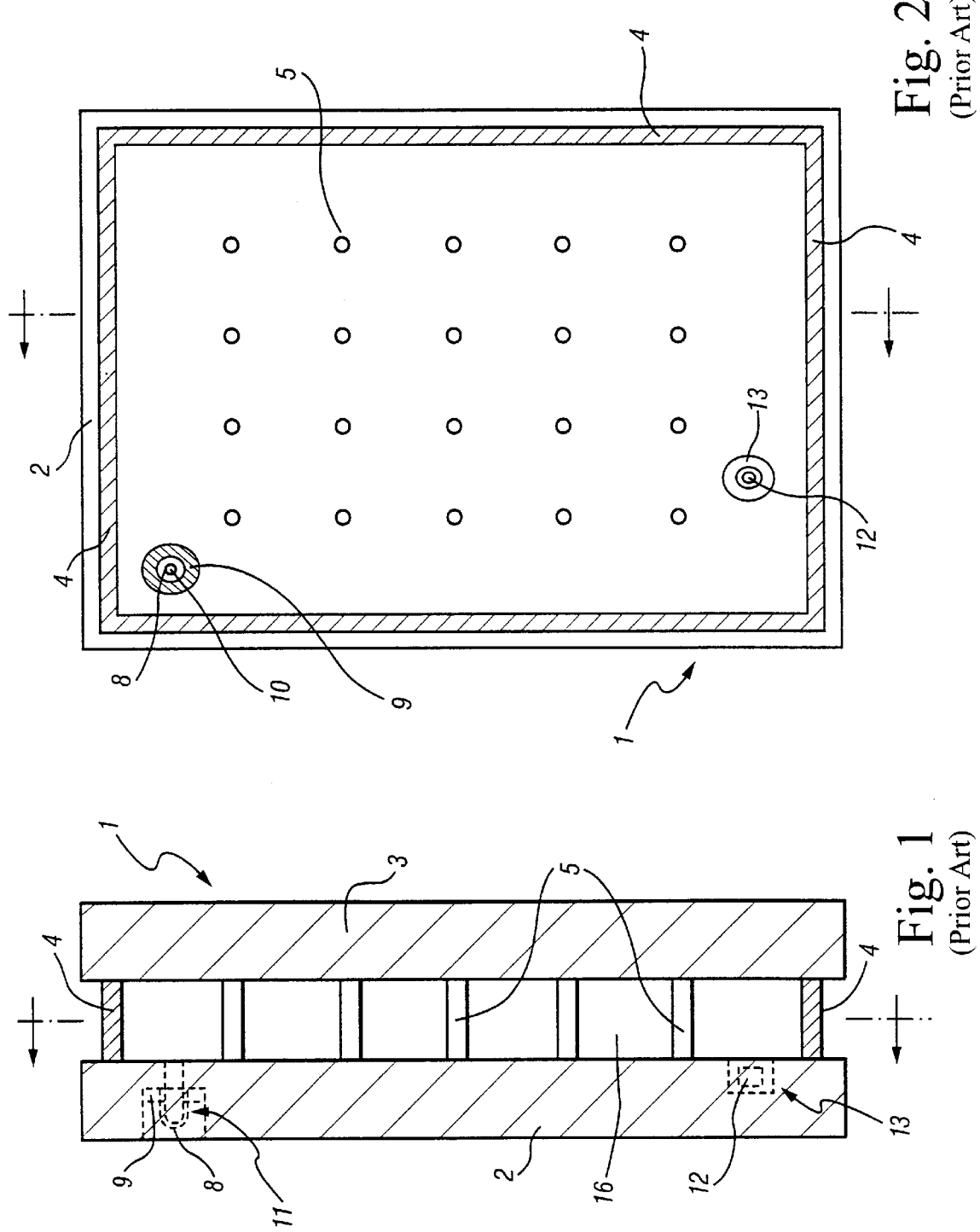
FIG. 1 is a prior art side partial cross sectional view of a conventional vacuum IG window unit.
FIG. 2 is a top partial cross sectional view of the FIG. 1 vacuum IG unit, absent the top glass substrate.

Referring now more particularly to the accompanying drawings in which like reference numerals indicate like parts throughout the several views.

Certain embodiments of this invention relate to spacers or pillars 5 for use in vacuum IG window units. In certain embodiments, the spacers or pillars 5 include sapphire or $Al_2O_3$. This enables the spacers or pillars to be substantially transparent to at least certain visible wavelengths of light, so that they are less visibly obtrusive than conventional opaque spacers. The spacers or pillars are, as in FIGS. 1–3, located in the low pressure space 16 between the opposing substrates. Edges of the substrates are hermetically sealed by edge or peripheral seal 4 (e.g. see FIGS. 1–3). "Peripheral" and "edge" seals herein do not mean that the seals are located at the absolute periphery of the unit, but instead mean that the seal is at least partially located at or near (e.g. within about two inches) an edge of at least one substrate of the unit.

FIGS. 4(a) and 4(b) illustrate an exemplary spacer or pillar 5 according to an embodiment of this invention. An array of such spacers or pillars 5 is to be provided in the low pressure space of the vacuum IG window unit(s) of any of FIGS. 1–3. While FIGS. 4(a)–(b) illustrate a cylindrically-shaped spacer or pillar 5, in other embodiments of this invention the spacers/pillars may take different shapes. For example, FIG. 5 illustrates a rectangular shaped spacer/pillar. Because interior space 16 between the opposing substrates is at a pressure lower or less than atmospheric in general, this type of panel is often referred to as a vacuum insulating glass (IG) unit.

Vacuum IG units according to different embodiments of this invention may be used as residential or commercial windows. The evacuation of space 16 eliminates or reduces heat transport between glass substrates 2 and 3 due to gaseous conduction and convection. In addition, radiative heat transport between glass sheets 2 and 3 can be reduced to a low level by providing a low emittance (low-E) coating (s) 6 on a surface of one or both of sheets 2, 3. High levels of thermal insulation can thus be achieved. Low gaseous thermal conduction may be achieved when the pressure in space 16 is reduced to a level equal to or below about $0.5 \times 10^{-3}$ Torr, more preferably below about 0.1 mTorr, or $10^{-4}$ Torr, and most preferably below about $10^{-6}$ Torr of atmospheric pressure. The hermetic sealing system(s) 4, including one or more edge seals, substantially eliminates any ingress or outgress of gas or air to/from low pressure space 16.

Referring to FIGS. 1–5, the array of spacers or pillars 5 is provided between substrates 2 and 3 in order to maintain separation of the two approximately parallel glass sheets against atmospheric pressure. In certain embodiments, each pillar may have a height of from about 0.10 to 0.60 mm. Spacers or pillars 5 may take any suitable shape, including those of FIGS. 4–5. For examples, spacers or pillars 5 may be spherical, cylindrical, square, rectangular, rod-like, bead-like, oval, trapezoidal, or the like. Moreover, in other embodiments, spacers/pillars 5 may be shaped as illustrated in any embodiment of U.S. Pat. No. 5,891,536.

In certain embodiments, all spacers/pillars 5 are of approximately the same size and/or material. However, in other embodiments, there may be different sizes of spacers 5 in the same vacuum IG unit. In certain embodiments, the density of spacers (i.e., the number of spacers per unit area) may be greater in certain areas than in other areas, or alternatively, the density of the spacers may be approximately uniform throughout the entire unit.

In preferred embodiments of this invention, spacers or pillars 5 include monocrystalline sapphire or $Al_2O_3$ having a hexagonal crystal structure. In other embodiments, spacers or pillars 5 consist essentially of monocrystalline sapphire or $Al_2O_3$ having a hexagonal crystal structure. Sapphire (which includes substantial portions of $Al_2O_3$ is of high strength (i.e., can withstand the atmospheric pressure applied inwardly on the opposing substrates 2, 3) and is substantially transparent (i.e., at least 80% transparent) to many wavelengths of visible light. More preferably, spacers 5 are transparent to at least about 90% (most preferably at least about 95%) of visible light wavelengths. Moreover, spacers/pillars 5 in certain embodiments have a hardness of at least about 7 M (MOHS), more preferably of at least about 9 MOHS (the hardness of sapphire is approximately 9 MOHS). Alternatively, spacers/pillars 5 preferably have a hardness of at least about 2,500 Vickers, more preferably from about 2,500–3,000 Vickers. The sapphire of the spacers may have a density of about 3.90 to 4.00 gm/cm$^3$ in certain embodiments.

Therefore, sapphire inclusive spacers or pillars 5 are visibly unobtrusive, and more aesthetically pleasing than conventional opaque spacers/pillars. Their translucent properties, similar to a single alumina crystal, and the purity of sapphire, allow the diffusion transmission of a large portion (all in certain embodiments) of visible wavelengths of light (compared to opaque metal and ceramic pillars). Background illumination conditions, both day and night, will thus alter the tint of spacers/pillars 5 to a shade or tint more closely matched to the background itself (i.e., the background is the area behind a vacuum IG window unit which a viewer is looking at through the window), so that the spacers blend in with the surrounding environment more easily and are not easy to see with the naked eye from three or more feet away.

In certain alternative embodiments of this invention, spacers/pillars 5 may instead include or be made of quartz, mica, or any other suitable material.

In certain embodiments of this invention, hermetic edge sealing material 4 may be made of or include any of the following materials: solder glass, indium, Ostalloy 313-4, 99% indium (In) wire available from Arconium (Providence, R.I.), liquid glass (i.e. glass composition with water in it when applied, wherein the water evaporates when heated to form the seal portion), rubber, silicone rubber, butyl rubber, Indalloy No. 53 available from Indium Corp. in paste form having a composition of 67% Bi and 33% In (% by weight), Indalloy No. 1 from Indium Corp. in paste form having a composition of 50% In and 50% Sn, Indalloy No. 290 available from Indium Corp. in paste form having a composition of 97% In and 3% Ag, Indalloy No. 9 from Indium Corp. in paste form having a composition of 70% Sn, 18% Pb and 12% In, Indalloy No. 281 available from Indium Corp. in paste form having a composition of 58% Bi and 42% Sn, Indalloy No. 206 available from Indium Corp. in paste form having a composition of 60% Pb and 40% In, Indalloy No. 227 available from Indium Corp. in paste form having a composition of 77.2% Sn, 20% In and 2.8% Ag, Indalloy No. 2 available from Indium Corp. in paste form having a composition of 80% In, 15% Pb and 5% Ag, Indalloy No. 3 available from Indium Corp. in paste form having a composition of 90% In and 10% Ag, or any other suitable flexible organic or inorganic material.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A thermally insulating glass panel comprising:
   first and second spaced apart glass substrates defining a low pressure space therebetween having a pressure less than atmospheric pressure;
   a plurality of spacers disposed between said first and second glass substrates for spacing said substrates from one another in order to maintain said low pressure space therebetween;

a hermetic edge or peripheral seal including at least one sealing material; and wherein at least some of said spacers include sapphire having a hexagonal crystal structure and being monocrystalline so as to be substantially transparent to at least certain wavelengths of visible light.

2. The glass panel of claim 1, wherein said at least some of said spacers are transparent to at least about 90% of visible light wavelengths.

3. The glass panel of claim 1, wherein said at least some of said spacers include by weight at least about 90% $Al_2O_3$.

4. The glass panel of claim 3, wherein said at least some of said spacers include by weight at least about 95% $Al_2O_3$.

5. The glass panel of claim 4, wherein said at least some of said spacers include by weight at least about 98% $Al_2O_3$.

6. The glass panel of claim 1, wherein said spacers are approximately cylindrical in shape.

7. The glass panel of claim 1, wherein said spacers have an approximately circular cross section when viewed from above.

8. A thermally insulating panel comprising:

first and second spaced apart substrates defining a space therebetween having a pressure less than atmospheric pressure; and a plurality of spacers disposed between said first and second substrates for spacing said substrates from one another, wherein at least one of said spacers includes monocrystalline $Al_2O_3$.

9. The panel of claim 8, wherein said at least one spacer is transparent to at least about 90% of visible light wavelengths.

10. The panel of claim 9, wherein said at least one spacer includes by weight at least about 90% $Al_2O_3$.

11. The panel of claim 10, wherein said at least one spacer includes by weight at least about 95% $Al_2O_3$.

12. A thermally insulating panel comprising:

first and second spaced apart substrates defining a space therebetween having a pressure less than atmospheric pressure; and a plurality of spacers disposed between said first and second substrates for spacing said substrates from one another, wherein at least one of said spacers consists essentially of monocrystalline sapphire having a hexagonal crystal structure.

13. A thermally insulating panel comprising:

first and second spaced apart substrates defining a space therebetween having a pressure less than atmospheric pressure; and a plurality of spacers disposed between said first and second substrates for spacing said substrates from one another, wherein at least one of said spacers is substantially transparent to at least some visible light wavelengths and has a hardness of at least about 7 MOHS, and includes monocrystalline sapphire having a hexagonal crystal structure.

14. The panel of claim 13, wherein said at least one spacer includes sapphire, and is substantially transparent to at least about 90% of visible light wavelengths.

15. The panel of claim 13, wherein said at least one spacer has a hardness of at least about 9 MOHS.

* * * * *